(12) United States Patent
Hamada

(10) Patent No.: US 11,897,544 B2
(45) Date of Patent: Feb. 13, 2024

(54) CENTER PILLAR INNER AND CENTER PILLAR

(71) Applicant: NIPPON STEEL CORPORATION, Tokyo (JP)

(72) Inventor: Koichi Hamada, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 0 days.

(21) Appl. No.: 17/640,631

(22) PCT Filed: Sep. 11, 2019

(86) PCT No.: PCT/JP2019/035764
§ 371 (c)(1),
(2) Date: Mar. 4, 2022

(87) PCT Pub. No.: WO2021/048958
PCT Pub. Date: Mar. 18, 2021

(65) Prior Publication Data
US 2022/0355868 A1    Nov. 10, 2022

(51) Int. Cl.
*B62D 25/04* (2006.01)
*B62D 29/00* (2006.01)

(52) U.S. Cl.
CPC .......... *B62D 25/04* (2013.01); *B62D 29/005* (2013.01)

(58) Field of Classification Search
CPC .... B62D 25/04; B62D 29/001; B62D 29/004; B62D 29/005
USPC .................. 296/193.06, 29, 901.01
See application file for complete search history.

(56) References Cited

U.S. PATENT DOCUMENTS

| 10,065,683 | B2 | 9/2018 | Steffens et al. |
| 2010/0244492 | A1 | 9/2010 | Itakura |
| 2014/0084633 | A1 | 3/2014 | Matsuda et al. |

FOREIGN PATENT DOCUMENTS

| DE | 10 2015 115 439 B3 | 1/2017 | |
| JP | 2013-212731 A | 10/2013 | |
| JP | 2014-80183 A | 5/2014 | |
| JP | 6366822 B2 * | 8/2018 | ............ B62D 25/06 |
| JP | 2019119147 A * | 7/2019 | |
| WO | WO 2015/025572 A1 | 2/2015 | |

OTHER PUBLICATIONS

Translation of JP2019119147, (Year: 2019).*
Translation of JP6366822 (Year: 2018).*

* cited by examiner

*Primary Examiner* — Dennis H Pedder
(74) *Attorney, Agent, or Firm* — Birch, Stewart, Kolasch & Birch, LLP

(57) ABSTRACT

Both weight reduction and impact resistance of a center pillar are satisfied while increase in cost is suppressed. A center pillar inner 20 is configured to include: an inner member 21 having an opening 21a to be a place where a retractor of a seat belt is mounted and a side sill mounting portion 21b to be a place where a side sill 30 is mounted; and a CFRP member 22 joined to a surface of the inner member 21, wherein the CFRP member 22 is provided at least between the opening 21a and the side sill mounting portion 21b.

4 Claims, 10 Drawing Sheets

CENTER PILLAR INNER AND CENTER PILLAR

TECHNICAL FIELD

The present invention relates to a center pillar inner of an automobile.

BACKGROUND ART

FIG. 1 is a view illustrating a vehicle body structure of a typical automobile, in which members such as a center pillar, a roof side rail, and a side sill are provided in a portion corresponding to a vehicle side surface. An upper end portion of the center pillar is joined to the roof side rail and a lower end portion of the center pillar is joined to the side sill. The center pillar requires impact resistance for protecting an occupant at the time of side collision of the automobile, and technical development to improve impact resistance has long been promoted.

Patent Document 1 discloses forming an inner member with a CFRP (carbon fiber reinforced plastic), of an outer member and the inner member constituting a center pillar. Patent Document 2 discloses forming an outer member with aluminum and forming an inner member with a CFRP. Patent Document 3 discloses filling a reinforcing member made of a CFRP between an outer member and an inner member.

PRIOR ART DOCUMENT

Patent Document

Patent Document 1: Japanese Laid-open Patent Publication No. 2013-212731
Patent Document 2: International Publication No. 2015/025572
Patent Document 3: Japanese Laid-open Patent Publication No. 2014-080183

DISCLOSURE OF THE INVENTION

Problems to be Solved by the Invention

When a CFRP is applied as an inner member of a center pillar as in Patent Documents 1 and 2, collision resistance the center pillar requires is not secured since the CFRP, though lighter than metal, is low in elongation. Further, using the inner member made of the CFRP as it is leads to significant cost increase compared with a case of using a metal, and is not preferable.

Further, reduction in weight of a vehicle is recently regarded as important for the sake of fuel efficiency improvement, and filling a reinforcing member between an outer member and an inner member as in Patent Document 3 inevitably causes a size of the reinforcing member to be large, bringing about further increase in weight. In a case of Patent Document 3, in order to reduce the weight of the vehicle, reducing a sheet thickness of the inner member may be considered, for example, but impact resistance of the center pillar cannot be secured.

The present invention has been made in view of the above-mentioned circumstances, and has an object to satisfy both weight reduction and impact resistance of a center pillar while suppressing increase in cost.

Means for Solving the Problems

In order to solve the above-mentioned problems, according to the present invention, there is provided a center pillar inner which includes: an inner member having an opening to be a place where a retractor of a seat belt is mounted and a side sill mounting portion to be a place where a side sill is mounted; and a CFRP member joined to a surface of the inner member, wherein the CFRP member includes a carbon fiber with a fiber direction falling within a range of −5 degrees to 5 degrees in relation to a longitudinal direction of the inner member and a matrix resin is a thermoplastic resin, and the CFRP member is provided at least between the opening and the side sill mounting portion.

According to the present invention from another point of view, there is provided a center pillar which includes: a center pillar outer; and the above-described center pillar inner, wherein the center pillar outer and the center pillar inner are joined in flange portions of each other.

Effect of the Invention

According to the present invention, it is possible to satisfy both weight reduction and impact resistance of a center pillar while suppressing increase in cost.

EMBODIMENTS FOR CARRYING OUT THE INVENTION

Hereinafter, embodiments of the present invention will be described with reference to the drawings. Note that in this description and the drawings, the same codes are given to components having substantially the same functional configurations to omit duplicated explanation.

First Embodiment

Figure 1:
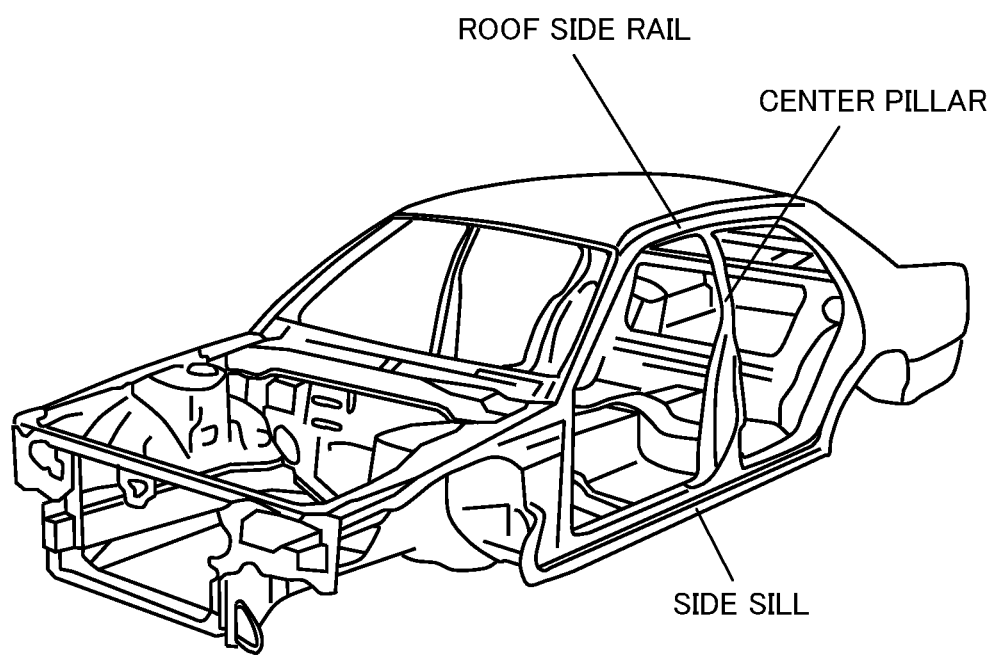
FIG. 1 is a view illustrating a vehicle body structure of a typical automobile.
Figure 2:
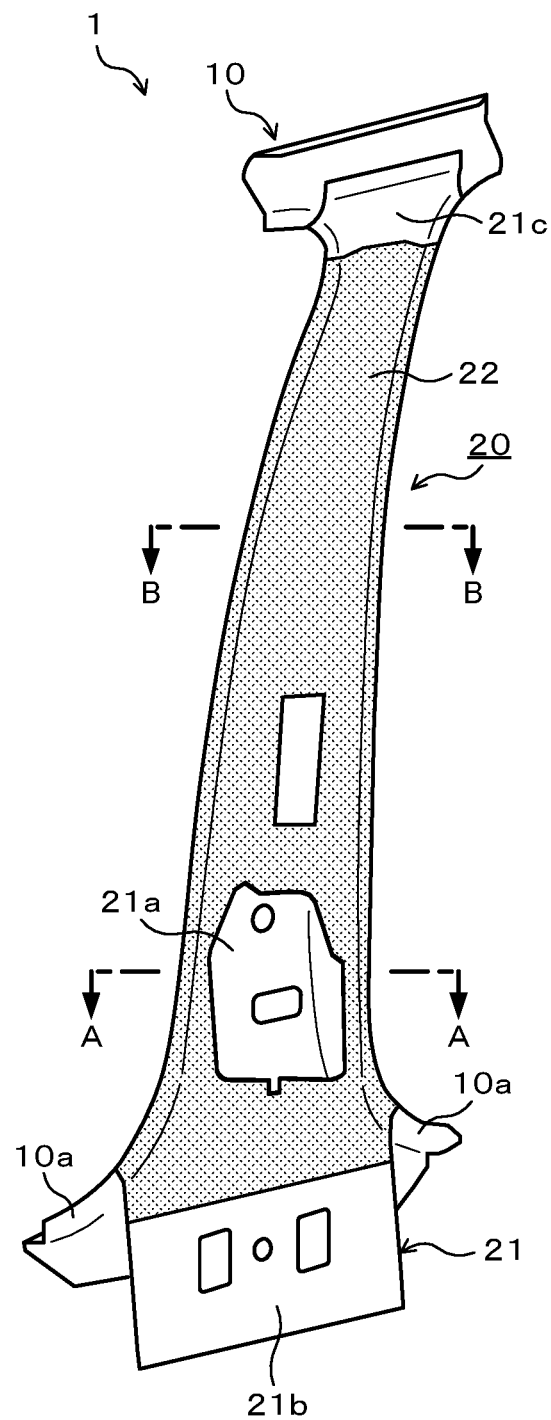
FIG. 2 is a view illustrating a schematic configuration of a center pillar according to a first embodiment of the present invention.
Figure 3:
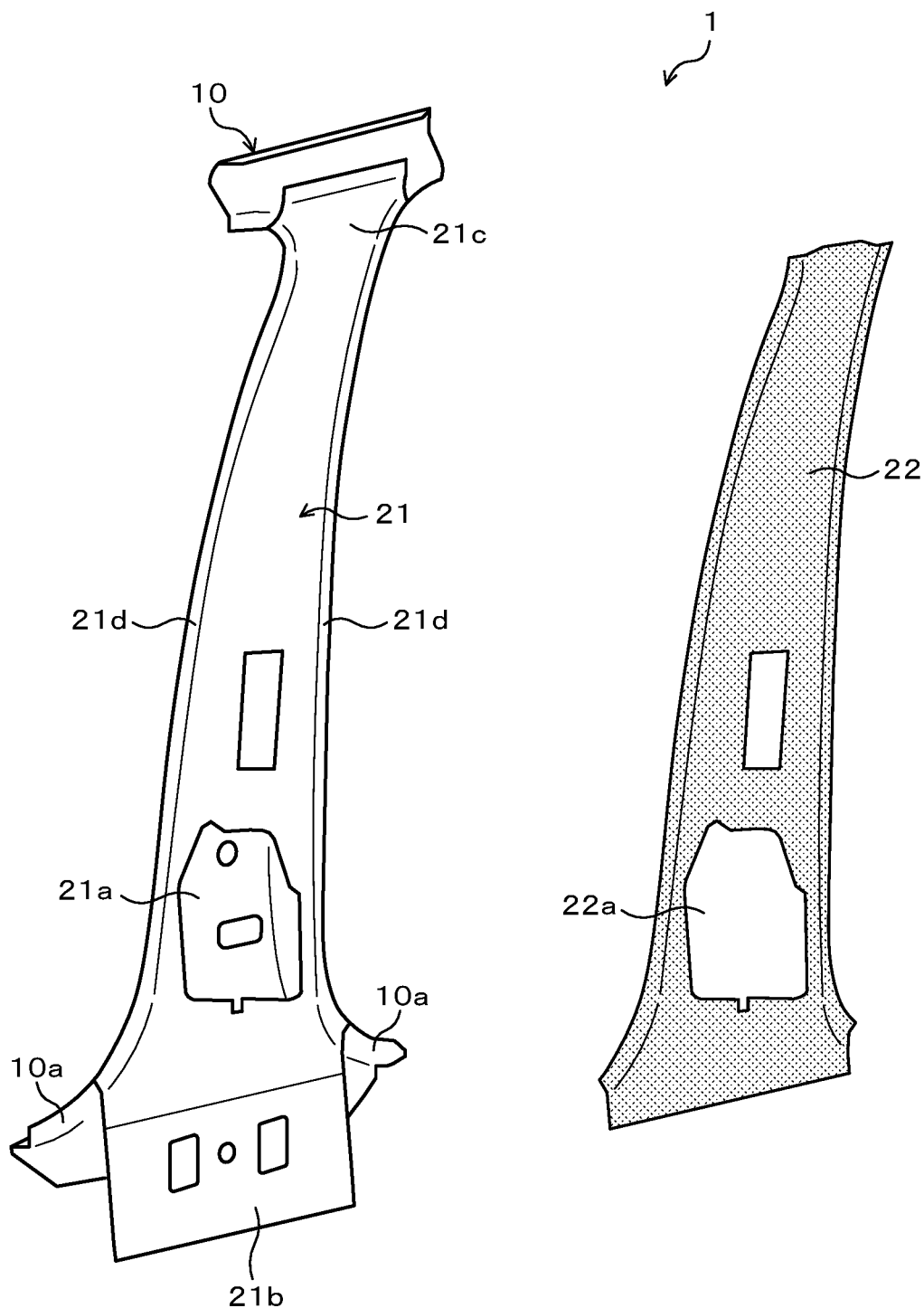
FIG. 3 is an exploded view of the center pillar according to the first embodiment of the present invention.

As illustrated in FIG. 2, a center pillar 1 of a first embodiment is constituted by a center pillar outer 10 and a center pillar inner 20. The center pillar outer 10 is a member made of, for example, a cold-rolled steel sheet, a hot-stamped steel sheet, or the like. As illustrated in FIG. 2 and FIG. 3, the center pillar inner 20 is constituted by an inner member 21 to be joined to the center pillar outer 10 and a CFRP member 22 joined to the inner member 21. The inner member 21 is a member made of, for example, a cold-rolled steel sheet, a hot-stamped steel sheet, a hot-rolled steel sheet, or the like. Note that materials constituting the center pillar outer 10 and the inner member 21 are not particularly limited as long as they are metals, and may be, for example, an aluminum alloy and so on. The CFRP member 22 is a member made of a carbon fiber reinforced plastic obtained by making a predetermined matrix resin contain a carbon fiber as a reinforcing fiber resin. The matrix resin and the carbon fiber constituting the CFRP member will be described later.

Figure 4:
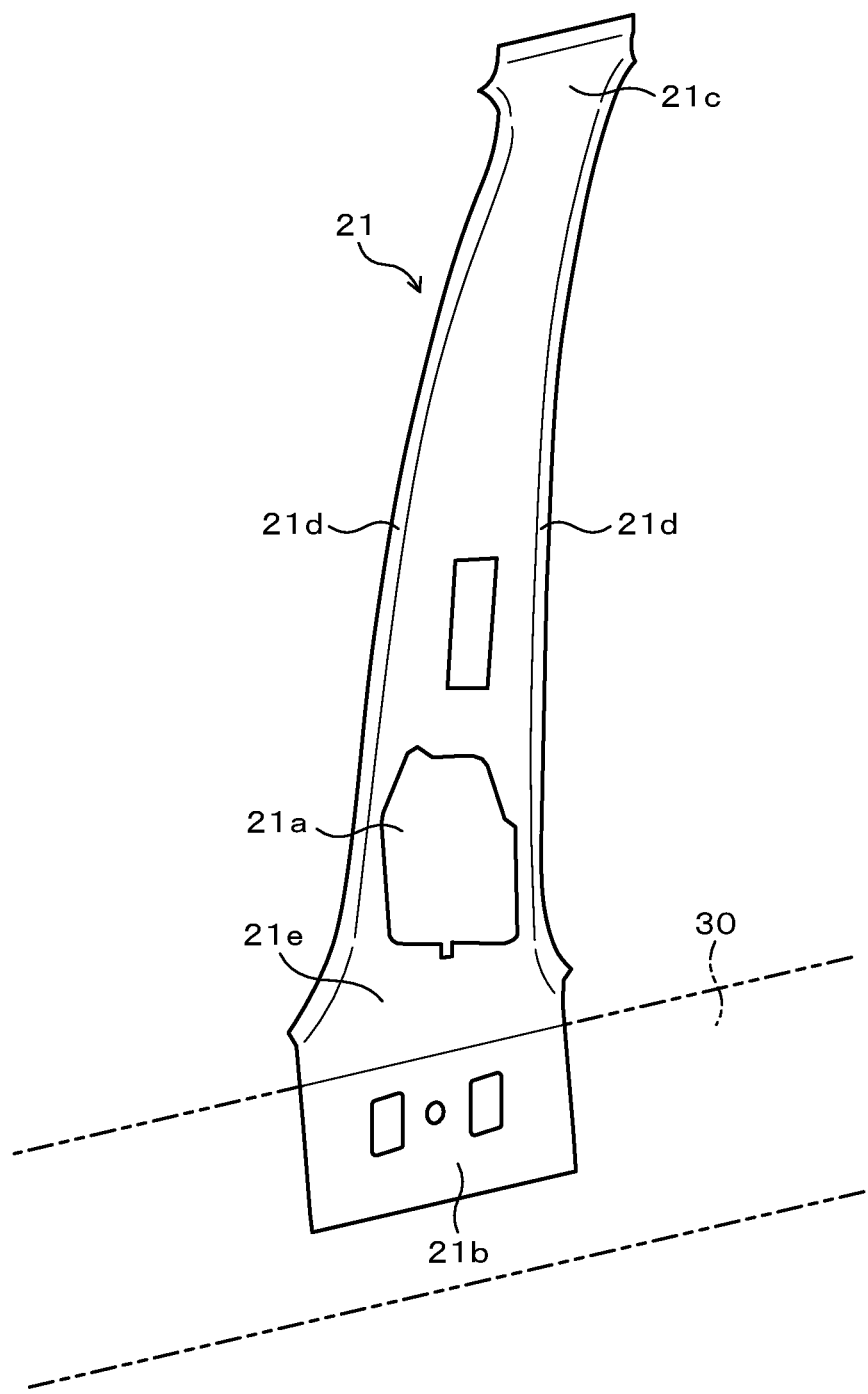
FIG. 4 is a view illustrating an inner member of the center pillar according to the first embodiment of the present invention.
Figure 5:
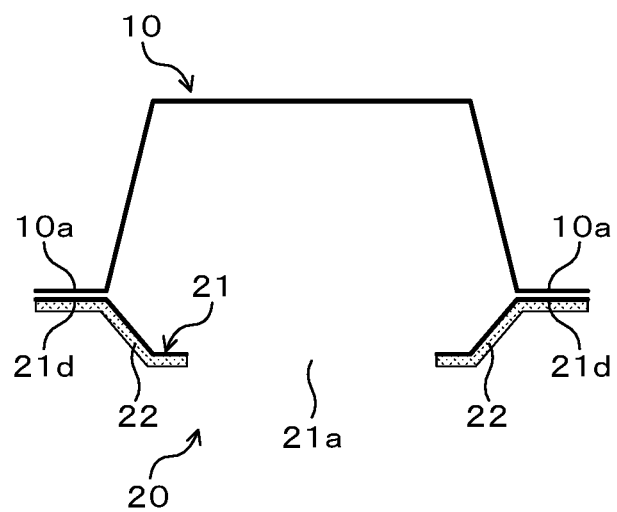
FIG. 5 is a cross-sectional view taken along a line A-A in FIG. 2.
Figure 6:
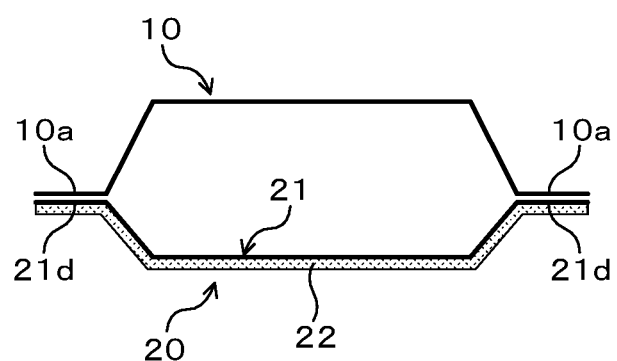
FIG. 6 is a cross-sectional view taken along a line B-B in FIG. 2.

As illustrated in FIG. 4, the inner member 21 being a component of the center pillar inner 20 has an opening 21a provided to allow mounting of a retractor (winding device) of a seat belt and a side sill mounting portion 21b provided to allow mounting of a side sill 30. The side sill mounting portion 21b corresponds to a portion covered by the side sill 30, of the inner member 21, when the inner member 21 and the side sill 30 are joined. Therefore, the opening 21a corresponds to a place where the retractor of the seat belt is mounted and the side sill mounting portion 21b corresponds to a place where the side sill 30 is mounted. The side sill mounting portion 21b of the first embodiment is formed to have a planar shape to enable surface contact with the side sill 30, but a shape of the side sill mounting portion 21b is not particularly limited.

As illustrated in FIG. 2 to FIG. 6, a shape from a lower part of the opening 21a to an upper end portion 21c of the inner member 21 is a hat shape in a cross-sectional view vertical to a height direction, and a flange portion 21d is formed. The center pillar 1 is produced by joining the flange portion 21d of the inner member 21 and a flange portion 10a of the center pillar outer 10 having a hat shape similarly to the inner member 21 to each other by, for example, spot welding.

In the first embodiment, the CFRP member 22 is provided in an entire surface of the inner member 21. A shape of the CFRP member 22 is the same as the shape between the side sill mounting portion 21b and the upper end portion 21c of the inner member 21, and the CFRP member 22 is provided with a hole 22a (FIG. 3) having the same shape as the opening 21a so that the opening 21a of the inner member 21 may not be covered, for example. A thickness of the CFRP member 22 is appropriately altered depending on required impact resistance and weight limit, and is preferably 1.0 to 4.0 mm, for example. In practice, the thickness is desirably 1.0 to 2.0 mm.

The CFRP member 22 is joined to a surface on a vehicle-interior side of the inner member 21. A method of joining the inner member 21 and the CFRP member 22 is not particularly limited, but joining is performed by using an adhesive, for example. Further, when the matrix resin of the CFRP member 22 is a thermoplastic resin, joining may be performed by heating the CFRP member 22 to heat seal the CFRP member 22 to the inner member 21. Thus, the center pillar inner 20 is produced by, for example, joining the inner member 21 and the center pillar outer 10 and thereafter bonding the CFRP member 22 on the surface of the vehicle-interior side of the inner member 21 by using the adhesive or by heat sealing. When the adhesive is used, the existence of the adhesive between the inner member 21 and the CFRP member 22 can be recognized in a cross-section of the center pillar inner 20.

Further, the center pillar inner 20 is produced by, for example, joining the CFRP member 22 to a blank of the inner member 21 in which the opening 21a is formed by the adhesive or by heat sealing, a shape of the CFRP member 22 being adjusted not to cover the opening 21a of the blank, and thereafter performing press forming Note that when the inner member 21 and the CFRP member 22 are joined before joining of the center pillar outer 10 and the center pillar inner 20, the CFRP member 22 is provided with a hole (not shown) at a position corresponding to a spotting position of spot welding, in order not to let the spotting point of spot welding of the center pillar outer 10 and the center pillar inner 20 be covered by the CFRP member 22.

Note that when the matrix resin of the CFRP member 22 is the thermoplastic resin, the inner member 21 and the CFRP member 22 can be joined more firmly by the adhesive or heat sealing as described above, compared with a case of using a thermosetting resin. Thereby, if impact is applied to the center pillar inner 20 at the time of side collision, the CFRP member 22 follows deformation of the inner member 21, resulting in a larger effect of reinforcement. Further, the CFRP for which the thermoplastic resin is used has a larger elongation than the CFRP for which the thermosetting resin (about 1 to 2%) is used. Therefore, when the thermoplastic resin is applied to the CFRP member 22, a workload by tension of the CFRP member 22 is larger at the time of side collision than in a case that the thermosetting resin is used, so that impact resistance is further improved. Note that a concrete method of joining the inner member 21 and the CFRP member 22 will be described later.

The center pillar inner 20 of the first embodiment and the center pillar 1 having this center pillar inner 20 are configured as described above. At the time of side collision, a compressive load is applied to the center pillar outer 10 and a tensile load is applied to the center pillar inner 20. Since the center pillar inner 20 of the first embodiment is provided with the CFRP member 22, the tensile load generated at the time of side collision can be received by the CFRP member 22. Since the CFRP is excellent in specific strength, it is possible to improve impact resistance without making the inner member 21 highly strong, while achieving weight reduction. Along with the above, it becomes possible to use a metal such as a mild steel sheet having high ductility for the inner member 21, so that fracture of the center pillar inner 20 at the time of side collision can be suppressed.

As described above, configuring the center pillar inner 20 by joining the CFRP member 22 to the inner member 21 can improve collision resistance as the center pillar 1. In other words, by using the center pillar inner 20 of the first embodiment, it is possible to secure sufficient impact resistance even when a sheet thickness of the inner member 21 is decreased for the purpose of weight reduction of the vehicle. That is, it is possible to satisfy both weight reduction and impact resistance of the center pillar 1. Further, in the center pillar inner 20 of the first embodiment, cost increase can be suppressed compared with a case of constituting the entire inner member 21 by the CFRP.

Further, in a case where the center pillar 20 is reused as a scrap material, especially when the inner member 21 is made of a steel sheet, an amount of the CFRP member 22 used in the center pillar inner 20 allows refining even if the inner member 21 and the CFRP member 22 are not separated and put into a steel converter of a steel plant to be melted, so that impurities are not excessively increased. Therefore, the center pillar inner 20 in which the CFRP member 22 is joined to the inner member 21 is excellent also in terms of recycling.

Second Embodiment

Figure 7:
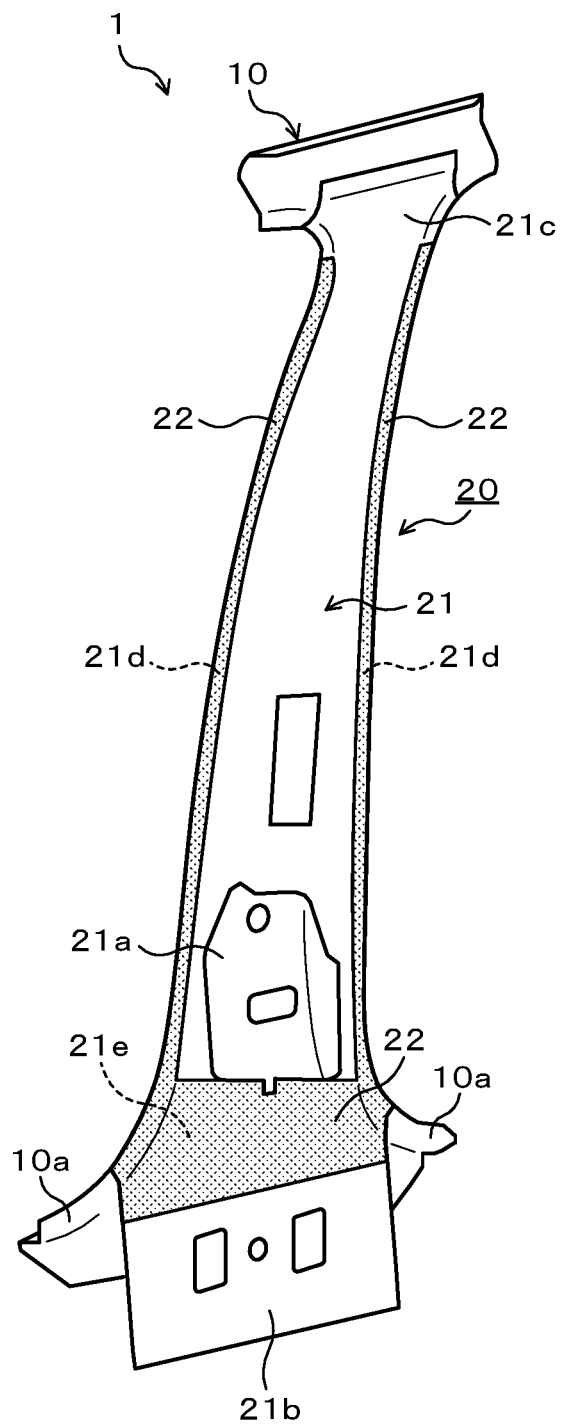
FIG. 7 is a view illustrating a schematic configuration of a center pillar according to a second embodiment of the present invention.
Figure 8:
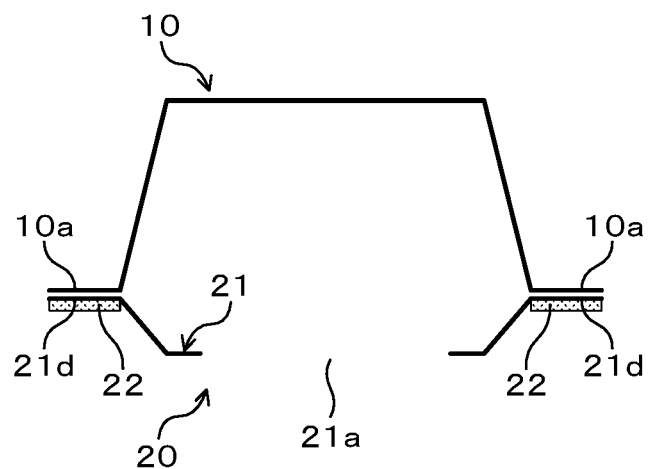
FIG. 8 is a view corresponding to a cross-section taken along a line A-A in FIG. 2, of the center pillar according to the second embodiment of the present invention.
Figure 9:
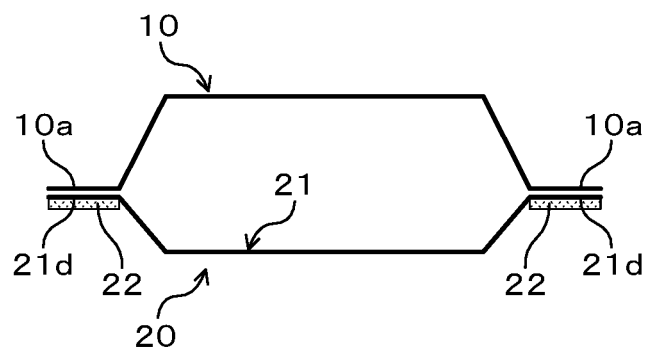
FIG. 9 is a view corresponding to a cross-section taken along a line B-B in FIG. 2, of the center pillar according to the second embodiment of the present invention.

As illustrated in FIG. 7 to FIG. 9, a CFRP member 22 of a second embodiment is not provided in an entire surface of an inner member 21 as in the first embodiment, but is provided in a region between an opening 21a and a side sill mounting portion 21b of the inner member 21 and in an entire flange portion 21d of the inner member 21. Note that in explanation hereinafter, the region between the opening 21a and the side sill mounting portion 21b of the inner member 21 is referred to as a "lower portion 21e" of the inner member 21.

At the time of side collision, large plastic strain is likely to occur in the lower portion 21e of the inner member 21 and the flange portion 21d on a side of the opening 21a, but since the center pillar inner 20 of the second embodiment is provided with the CFRP member 22 in the lower portion 21e and the entire flange portion 21d, it is possible to efficiently reinforce places which tend to be deformed at the time of side collision. In other words, the flange portion 21d is a part where a center pillar outer 10 is joined, and is a part which is likely to receive impact input to the center pillar outer 10. Providing the CFRP member 22 in the flange portion 21d can suppress deformation of the flange portion 21d according to deformation of the center pillar outer 10 by side collision. Thereby, impact resistance of the center pillar inner 20 can be improved effectively. Therefore, using the center pillar inner 20 of the second embodiment can decrease an amount used of the CFRP member 22 to thereby promote reduction in cost and weight compared with a case of the CFRP member 22 provided in the entire surface of the inner member 21 as in the first embodiment, and can secure sufficient impact resistance.

Third Embodiment

Figure 10:
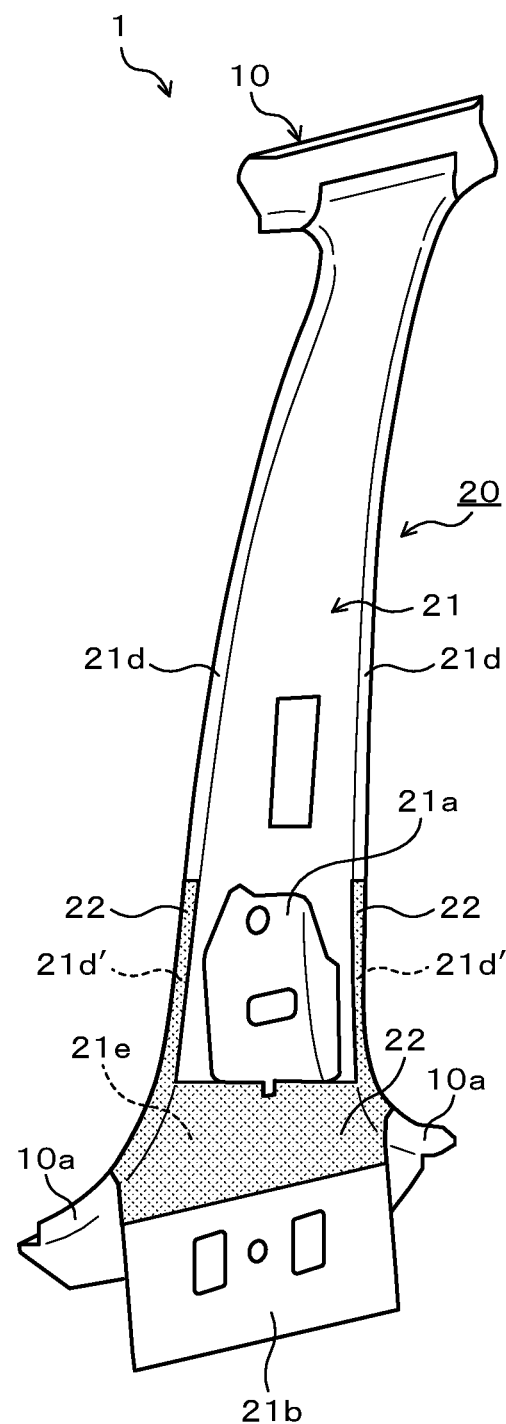
FIG. 10 is a view illustrating a schematic configuration of a center pillar according to a third embodiment of the present invention.

As illustrated in FIG. 10, a CFRP member 22 of a third embodiment is provided in a lower portion 21e of an inner member 21 and a flange portion 21d' on a side of an opening 21a. As described above, since plastic strain of the inner member 21 which occurs at the time of side collision is likely to be large in the lower portion 21e and the flange portion 21d' on the side of the opening 21a, providing the CFRP member 22 in the flange portion 21d' on the side of the opening 21a can effectively reinforce the inner member 21 even if the CFRP member 22 is not provided in the flange portion 21d' positioned upper than the opening 21a as in the second embodiment. Therefore, using the center pillar inner 20 of the third embodiment can further decrease an amount used of the CFRP member 22 to thereby promote reduction in cost and weight compared with the center pillar inner 20 of the second embodiment, and can secure sufficient impact resistance.

Fourth Embodiment

Figure 11:
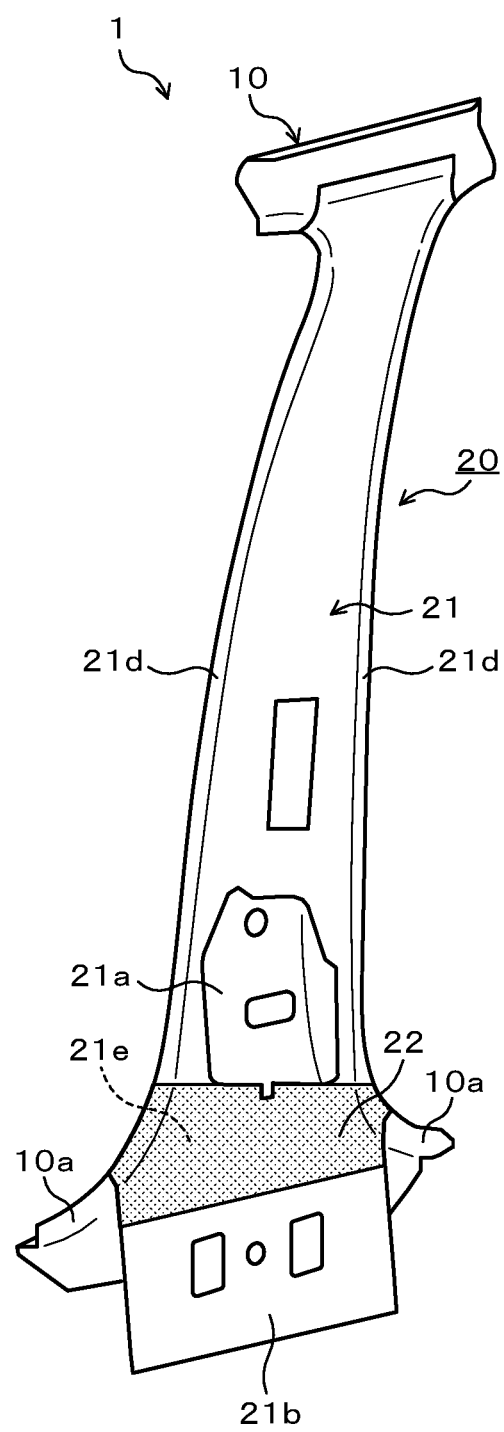
FIG. 11 is a view illustrating a schematic configuration of a center pillar of a fourth embodiment of the present invention.

As illustrated in FIG. 11, a CFRP member 22 of a fourth embodiment is provided only in a lower portion 21e of an inner member 21. Plastic strain of the inner member 21 which occurs at the time of side collision is likely to be prominently large in the lower portion 21e which is a region between a side sill mounting portion 21b and an opening 21a in the inner member 21. Therefore, even in a case where the CFRP member 22 is provided only in the lower portion 21e as in the fourth embodiment, the inner member 21 can be effectively reinforced. Thus, using the center pillar inner 20 of the fourth embodiment can secure sufficient impact resistance while further promoting reduction in weight compared with the center pillar inner 20 of the third embodiment, bringing about a superior weight efficiency.

As described in the above first to fourth embodiments, plural embodiments exist in terms of joining part of the CFRP member 22 to the inner member 21, but in view of satisfying both weight reduction and impact resistance while suppressing cost increase, it is necessary that the CFRP member 22 is provided at least in the lower portion 21e of the inner member 21 where plastic strain occurs most severely at the time of side collision.

Hereinabove, the embodiments of the present invention were described, but the present invention is not limited to such examples. It should be understood that various changes and modifications are readily apparent to those skilled in the art to which the present invention belongs within the scope of the technical idea as set forth in claims, and those should also be covered by the technical scope of the present invention.

For example, in the first to fourth embodiments, the CFRP member 22 is joined to the surface on the vehicle-interior side of the inner member 21, but the CFRP member 22 may be joined to a surface on a vehicle-exterior side of the inner member 21. In other words, the CFRP member 22 may be provided between the center pillar outer 10 and the inner member 21. In this case, the center pillar inner 20 is produced by performing press forming in a state where a blank of the inner member 21 and the CFRP member 22 are joined in advance. Thereafter, the center pillar outer 10 and the center pillar inner 20 are joined by, for example, spot welding, to thereby constitute the center pillar 1. Note that when spot welding is performed, the CFRP member 22 is provided with a hole (not shown) at a position corresponding to a spotting position of spot welding, in order not to let the spotting point of spot welding of inner member 21 be covered by the CFRP member 22.

When the CFRP member 22 is provided between the center pillar outer 10 and the inner member 21 as described above, there is required a processing such as proving a hole for spot welding in the CFRP member 22 or providing a bearing surface for spot welding in either one of the center pillar outer 10 and the center pillar inner 20. Therefore, there is a concern such as increase in processing cost and decrease in rigidity of the member due to the processing, and thus the place where the CFRP member 22 is joined is preferable to be the surface on the vehicle-interior side of the inner member 21.

<Kind of CFRP Member>

A CFRP member which can be bonded to an inner member in each embodiment means a carbon fiber reinforced plastic member made of a matrix resin and a carbon fiber material contained in the matrix resin and complexed therewith. As the carbon fiber, for example, a PAN-based carbon fiber or a pitch-based carbon fiber can be used. Using the carbon fiber can efficiently improve a strength or the like in relation to a weight. A CFRP used here is preferable to be one with a volume fraction of contained carbon fiber of 50 to 70% and with a fiber direction of the carbon fiber which extends along a longitudinal direction of a center pillar inner (when the center pillar inner is moderately curved along the longitudinal direction, a fiber direction which extends along that curve), and concretely, is desirable to be one with a fiber direction of the carbon fiber which falls within a range of −5 degrees to 5 degrees in relation to the above direction. Note that an alignment state of the carbon fiber in the CFRP can be identified by observing and analyzing the CFRP member by using microfocus X-ray CT (X-ray computed tomography). Note that preferably a tensile strength of the CFRP in the above direction is 1500 MPa or more, a Young's modulus is 102 GPa or more, and a fracture elongation is 1.5% or more.

As the matrix resin used for the CFRP member, a thermoplastic resin is usable. Examples of the thermoplastic resin include polyolefin (polyethylene, polypropylene, or the like) and an acid-modified product thereof, a polyamide resin such as nylon 6 and nylon 66, thermoplastic aromatic polyester such as polyethylene terephthalate and polybutylene terephthalate, polycarbonate, polyethersulfone, polyphenyleneether and a modified product thereof, a styrene-based resin such as polyarylate, polyetherketone, polyetheretherketone, polyetherketoneketone, vinyl chloride, or polystyrene, and a phenoxy resin. Note that the matrix resin may be formed of a plurality of kinds of resin materials.

In consideration of application to a metal member, the thermoplastic resin is used as the matrix resin from the viewpoints of workability and productivity as well as followability to deformation of the metal member because of a large tensile elongation. Further, using the phenoxy resin as the matrix resin can increase a density of the reinforced fiber material and improves adhesiveness to the metal member and followability to deformation of the metal member, so that, consequently, peeling of the CFRP from the metal member is suppressed and that energy absorption at the time of impact load input is efficiently performed, to thereby improve an energy absorption performance. Further, the phenoxy resin has heat resistance nearly equal to that of the epoxy resin since a molecular structure thereof closely resembles that of the epoxy resin being the thermosetting resin. In addition, further adding a curing component also enables application to a high-temperature environment. When the curing component is added, its addition amount only needs to be appropriately determined in consideration of impregnating ability into the reinforced fiber material, brittleness of the FRP member, tact time, workability, and so on.

<Adhesive Resin Layer>

When the reinforcing member is formed of the CFRP member or the like, an adhesive resin layer may be provided between the CFRP member and the metal member (the inner member 21 in the above-described embodiment) to join the CFRP member and the metal member by the adhesive resin layer.

The kind of adhesive resin composition to form the adhesive resin layer is not particularly limited. For example, the adhesive resin composition may be either one of the thermosetting resin and the thermoplastic resin. The kinds of the thermosetting resin and the thermoplastic resin are not particularly limited. For example, as the thermoplastic resin, there can be used one or more kinds selected from polyolefin and an acid-modified product thereof, polystyrene, polymethyl methacrylate, an AS resin, an ABS resin, thermoplastic aromatic polyester such as polyethylene terephthalate or polybutylene terephthalate, polycarbonate, polyimide, polyamide, polyamide-imide, polyetherimide, polyethersulfone, polyphenyleneether and a modified product thereof, polyphenylene sulfide, polyoxymethylene, polyarylate, polyetherketone, polyetheretherketone, polyetherketoneketone, and so on. Further, as the thermosetting resin, for example, there can be used one or more kinds selected from an epoxy resin, a vinylester resin, a phenolic resin, and a urethane resin.

The adhesive resin composition can be appropriately selected according to properties of the matrix resin constituting the CFRP member, properties of the reinforcing member, or properties of the metal member. For example, by using a resin having a functional group with polarity or a resin subjected to acid modification or the like as the adhesive resin layer, the adhesion properties are improved.

As described above, adhering the CFRP member to the metal member by using the above-mentioned adhesive resin layer can improve adhesiveness between the CFRP member and the metal member. Thereby, it is possible to improve deformation followability of the CFRP member when a load is input to the metal member. In this case, it becomes possible to exhibit the effect of the CFRP member to a deformed body of the metal member more securely.

Note that a form of the adhesive resin composition used to form the adhesive resin layer can be, for example, powder, a liquid such as varnish, or a solid such as a film.

Further, a crosslinking curable resin and a crosslinking agent may be compounded into the adhesive resin composition to thereby form a crosslinkable adhesive resin composition. This improves heat resistance of the adhesive resin composition, enabling application under a high-temperature environment. As the crosslinking curable resin, for example, a bifunctional or higher epoxy resin or a crystalline epoxy resin can be used. Further, as the crosslinking agent, an amine, an acid anhydride, or the like can be used. Further, into the adhesive resin composition, other additives such as various kinds of rubber, an inorganic filler, and a solvent may be compounded in a range not to impair its adhesion properties or physical properties.

Compositing the CFRP member to the metal member can be realized by various methods. The composite CFRP member is obtained by, for example, adhering a CFRP to constitute the CFRP member or a prepreg for CFRP molding being a precursor thereof and a metal member by means of the above-mentioned adhesive resin composition and solidifying (curing) the adhesive resin composition. In this case, for example, by performing thermocompression bonding, the CFRP member and the metal member can be composited.

Adhering of the above-mentioned CFRP or prepreg for CFRP molding to the metal member can be performed before molding of parts, during molding thereof, or after molding thereof. For example, after molding a metal material being a workpiece into the metal member, the CFRP or the prepreg for CFRP molding may be adhered to the metal member. Further, after adhering the CFRP or the prepreg for CFRP molding to the workpiece by thermocompression bonding, the workpiece to which the CFRP member is adhered may be molded to obtain the composited metal member. As long as the matrix resin of the CFRP member is the thermoplastic resin, it is possible to perform molding such as bending to a portion to which the CFRP member has been adhered. In addition, when the matrix resin of the CFRP member is the thermoplastic resin, composite integrated molding in which a thermocompression bonding process and a molding process are integrated may be performed.

Note that a joining method of the CFRP member and the metal member is not limited to adhering by the above-mentioned adhesive resin layer. For example, the CFRP member and the metal member may be mechanically joined. More concretely, fastening holes may be formed in corresponding positions of the CFRP member and the metal member to join the CFRP member and the metal member by fastening them through the holes by a fastening means such as a bolt or a rivet. In addition, the CFRP member and the metal member may be joined by well-known joining means. Further, the CFRP member and the metal member may be joined in a complex manner by a plurality of joining means. For example, adhering by an adhesive resin layer and fastening by a fastening means may be used in a complex manner <Metal Member and Surface Treatment Thereof>

The metal member according to the present invention may be plated. Thereby, corrosion resistance is improved. In particular, when the metal member is a steel material, plating is more suitable. The kind of plating is not particularly limited, and well-known plating can be used. For example, as a plated steel sheet (steel material), there can be used a hot-dip galvanized steel sheet, a hot-dip alloyed galvanized steel sheet, a Zn—Al—Mg-based alloy plated steel sheet, an aluminum-plated steel sheet, an electrogalvanized steel sheet, an electric Zn—Ni-based alloy plated steel sheet, or the like.

Further, the metal member may be covered on its surface by a coating film called conversion treatment. Thereby, corrosion resistance is further improved. As the conversion treatment, generally well-known conversion treatment can be used. For example, as the conversion treatment, there can be used zinc phosphate treatment, chromate treatment, chromate-free treatment, or the like. Further, the above-described coating film may be a well-known resin coating film.

Further, the metal member may be one having been subjected to generally well-known painting. Thereby, corrosion resistance can be further improved. For painting, a well-known resin can be used. For example, for the painting, there can be used painting in which an epoxy resin, a urethane resin, an acrylic resin, a polyester resin, a fluorine-based resin, or the like is used as a main resin. Further, to the painting, as necessary, generally well-known pigment may be added. In addition, the painting may be clear painting in which the pigment is not added. Such painting may be applied on the metal member in advance before the CFRP member is composited, or may be applied on the metal member after the CFRP member is composited. Further, after applying the painting on the metal member in advance, the CFRP member may be composited and thereafter the painting may be further applied. A paint material used for the painting may be a solvent-based paint material, a water-based paint material, a powder paint material, or the like. As a method to perform the painting, generally well-known methods can be applied. For example, as the method to perform the painting, there can be used electrodeposition painting, spray painting, electrostatic painting, dip painting, or the like. The electrodeposition painting, which is suitable for covering an end face and a gap portion of the metal member, is excellent in corrosion resistance after the painting. In addition, by performing generally well-known conversion treatment such as zinc phosphate treatment or zirconia treatment on the surface of the metal member before the painting, paint film adhesiveness is improved.

Examples

Figure 12:
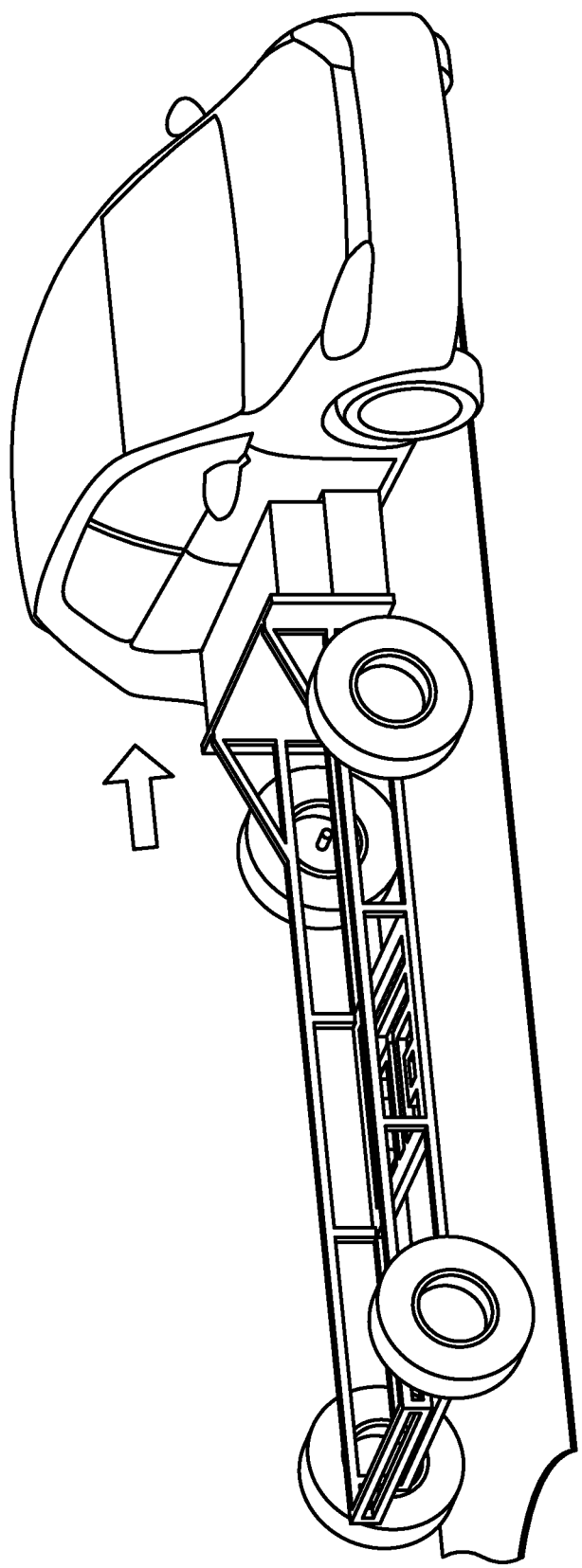
FIG. 12 is a view illustrating an analysis model of side collision simulation in an example.

In order to evaluate impact resistance depending on a difference in configuration of a center pillar inner, an analysis model illustrated in FIG. 12 is prepared to carry out side crash simulation. Conditions for the simulation comply with conditions for side collision test of JNCAP (Japan New Car Assessment Program). Table 1 below shows a configuration of each center pillar on which side collision simulation is performed.

TABLE 1

| CONFIGURATION OF CENTER PILLAR INNER | | COMPARATIVE EXAMPLE 1 STEEL SHEET ONLY (ORIGINAL) | COMPARATIVE EXAMPLE 2 STEEL SHEET ONLY (THINNED) | EXAMPLE 1 STEEL SHEET (THINNED) + THERMOPLASTIC CFRP | EXAMPLE 2 STEEL SHEET (THINNED) + THERMOPLASTIC CFRP | EXAMPLE 3 STEEL SHEET (THINNED) + THERMOPLASTIC CFRP |
|---|---|---|---|---|---|---|
| MATERIAL | OUTER | HS1.5G | HS1.5G | HS1.5G | HS1.5G | HS1.5G |
|  | INNER | 340/t0.95 | 340/t0.6 | 340/t0.6 | 340/t0.6 | 340/t0.6 |
|  | CFRP | — | — | ENTIRE SURFACE (t2.0) | FLANGE + LOWER (t2.0) | LOWER (t2.0) |
| WEIGHT [kg] | OUTER | 3.98 | 3.98 | 3.98 | 3.98 | 3.98 |
|  | INNER | 1.63 | 1.03 | 1.03 | 1.03 | 1.03 |
|  | CFRP | — | — | 0.484 | 0.182 | 0.126 |
|  | ADHESIVE | — | — | 0.058 | 0.022 | 0.015 |
|  | TOTAL | 5.61 | 5.01 (▼0.6) | 5.55 (▼0.06) | 5.21 (▼0.4) | 5.15 (▼0.46) |

| CONFIGURATION OF CENTER PILLAR INNER | | COMPARATIVE EXAMPLE 3 STEEL SHEET (THINNED) + THERMOSETTING CFRP | COMPARATIVE EXAMPLE 4 STEEL SHEET (THINNED) + THERMOSETTING CFRP | COMPARATIVE EXAMPLE 5 STEEL SHEET (THINNED) + THERMOSETTING CFRP |
|---|---|---|---|---|
| MATERIAL | OUTER | HS1.5G | HS1.5G | HS1.5G |
|  | INNER | 340/t0.6 | 340/t0.6 | 340/t0.6 |
|  | CFRP | ENTIRE SURFACE (t2.0) | FLANGE + LOWER (t2.0) | LOWER (t2.0) |
| WEIGHT [kg] | OUTER | 3.98 | 3.98 | 3.98 |
|  | INNER | 1.03 | 1.03 | 1.03 |
|  | CFRP | 0.443 | 0.167 | 0.115 |
|  | ADHESIVE | 0.058 | 0.022 | 0.015 |
|  | TOTAL | 5.51 (▼0.1) | 5.20 (▼0.41) | 5.14 (▼0.47) |

A center pillar inner of Comparative Example 1 is constituted only by a steel sheet of 0.95 mm in sheet thickness and 340 MPa in tensile strength. A center pillar inner of Comparative Example 2 is constituted only by a steel sheet of 0.6 mm in sheet thickness and 340 MPa in tensile strength. The steel sheet of Comparative Example 2 is smaller in sheet thickness than the steel sheet of Comparative Example 1, and is what is called a thinned steel sheet.

A center pillar inner of Example 1 has a configuration in which a CFRP member of 2 mm in sheet thickness is bonded on an entire surface of the steel sheet of Comparative Example 2 by using an adhesive, that is, a configuration similar to that of the first embodiment illustrated in FIG. 2. A center pillar inner of Example 2 has a configuration in which a CFRP member of 2 mm in sheet thickness is bonded on a lower portion and an entire flange portion of the steel sheet of Comparative Example 2 by using an adhesive, that is, a configuration similar to that of the second embodiment illustrated in FIG. 7. A center pillar inner of Example 3 has a configuration in which a CFRP member of 2 mm in sheet thickness is bonded on a lower portion and a flange portion on a side of an opening of the steel sheet of Comparative Example 2 by using an adhesive, that is, a configuration similar to that of the fourth embodiment illustrated in FIG. 10. Center pillar outers of respective embodiments are common to one another and are constituted only by hot-stamped steel sheets of 1.5 GPa in tensile strength. Here, a matrix resin used for each CFRP member of Examples 1 to 3 is a phenoxy resin being a thermoplastic resin. Further, a CFRP whose matrix resin is the phenoxy resin which is used here is one with a volume fraction of contained carbon fiber of 50% and with a fiber direction of carbon fiber which extends along a longitudinal direction of the center pillar inner (when the center pillar inner is moderately curved along the longitudinal direction, a fiber direction which extends along that curve). Note that a tensile strength of the CFRP in the above direction is 1500 MPa, a Young's modulus is 102 GPa, and a fracture elongation is 1.5%. An adhesive strength of the steel sheet and the CFRP is analyzed at a shear breaking stress of 30 MPa.

Further, a center pillar inner of Comparative Example 3 has the same configuration as Example 1, but only a matrix resin used for a CFRP member is replaced by an epoxy resin being a thermosetting resin. A center pillar inner of Comparative Example 4 has the same configuration as Example 2, but only a matrix resin used for a CFRP member is replaced by an epoxy resin being a thermosetting resin. A center pillar inner of Comparative Example 5 has the same configuration as Example 3, but only a matrix resin used for a CFRP member is replaced by an epoxy resin being a thermosetting resin. The CFRP whose matrix resin is the epoxy resin which is used in each comparative example is one with a volume fraction of contained carbon fiber of 50% and with a fiber direction of carbon fiber which extends along a longitudinal direction of the center pillar inner (when the center pillar inner is moderately curved along the longitudinal direction, a fiber direction which extends along that curve), and a tensile strength of the CFRP with the epoxy resin being the matrix resin in the above direction is 1500 MPa, a Young's modulus is 102 GPa, and a fracture elongation is 0.9%. An adhesive strength of the steel sheet and the CFRP is analyzed at a shear breaking stress of 30 MPa.

Note that a numeric value in a parenthesis written in an item of total weight in Table 1 indicates a difference from a total weight of the center pillar of Comparative Example 1.

In the side collision simulation performed under the above-described conditions, there are evaluated an intrusion amount of the center pillar into a vehicle-interior side at a ground height corresponding to a chest portion and a lower back portion of an occupant and a weight efficiency. Table 2 below shows a rate of change (collision decrease in Table 2) of pillar intrusion amount and weight efficiency (collision decrease/increased weight) in each center pillar of Comparative Examples 1, 3 to 5 and Examples 1 to 3 in relation to the center pillar of Comparative Example 2.

TABLE 2

EVALUATION OF WEIGHT EFFICIENCY IN RELATION TO COMPARATIVE EXAMPLE (t0.6, WITHOUT REINFORCEMENT)

| | | CHEST PORTION | | LOWER BACK PORTION | |
| --- | --- | --- | --- | --- | --- |
| | INCREASED WEIGHT (kg) | COLLISION DECREASE (%) | WEIGHT EFFICIENCY (COLLISION DECREASE/ INCREASED WEIGHT) | COLLISION DECREASE (%) | WEIGHT EFFICIENCY (COLLISION DECREASE/ INCREASED WEIGHT) |
| COMPARATIVE EXAMPLE 1 | 0.60 | 3.47 | 5.79 | 1.57 | 2.62 |
| EXAMPLE 1 | 0.54 | 11.16 | 20.66 | 3.64 | 6.74 |
| EXAMPLE 2 | 0.20 | 3.28 | 16.41 | 1.77 | 8.86 |
| EXAMPLE 3 | 0.14 | 1.07 | 7.67 | 1.18 | 8.44 |
| COMPARATIVE EXAMPLE 3 | 0.50 | 0.47 | 0.94 | 0.24 | 0.48 |
| COMPARATIVE EXAMPLE 4 | 0.19 | 0.21 | 1.11 | 0.16 | 0.84 |
| COMPARATIVE EXAMPLE 5 | 0.13 | 0.15 | 1.15 | 0.11 | 0.85 |

As shown in Table 2, in the center pillars in Examples 1 to 3, the weight efficiencies related to collision decrease effects in both the chest portion and the lower back portion are improved in relation to the center pillar of Comparative Example 1 whose inner member sheet thickness is large. Further, in this simulation, an improvement effect of the weight efficiency to the chest portion is the largest in Example 1 and an improvement effect of the weight efficiency to the lower back portion is the largest in Example 2. In Example 3 also, an improvement effect of the weight efficiency to the lower back portion is equal to that of Example 2, and Example 3 is excellent in weight efficiency.

The center pillar of Example 1 does not have a large weight reduction effect in relation to Comparative Example 1 in which the sheet thickness of the inner member is large, but in view of the result shown in Table 2 above, in a case of the configuration of the center pillar inner of Example 1, even if the sheet thickness of the inner member is made further smaller, it is estimated that sufficient impact resistance can be attained. Therefore, it is possible to secure the impact resistance equal to or larger than that of Comparative Example 1 while promoting further weight reduction. Accordingly, using the center pillar inner of Example 1 can satisfy both weight reduction and impact resistance.

Collision reduction effects to both chest portion and lower back portion of the center pillar of Example 2 are at levels nearly equal to those of Comparative Example 1, but weight efficiencies thereof are improved. Therefore, using the center pillar inner of Example 2 can satisfy both weight reduction and impact resistance. Further, with respect to a collision reduction effect of the center pillar of Example 3, impact resistance as the entire center pillar including for the chest portion and the lower back portion is at a level nearly equal to that of Comparative Example 1 in which the sheet thickness of the inner member is large. Further, the center pillar of Example 3 has a large weight reduction effect in relation to Comparative Example 1 in which the sheet thickness of the inner member is large, as shown in Table 2. Therefore, using the center pillar inner of Example 3 can satisfy both weight reduction and impact resistance. Further, in Example 3, the weight reduction effect is large in relation to Comparative Example 1, and thus, even if the sheet thickness of the CFRP member is made larger by, for example, 0.1 mm to increase impact resistance, the weight reduction effect in relation to Comparative Example 1 can be sufficiently obtained.

Further, a configuration of the center pillar inner of Example 3 is such that the CFRP member is provided in the lower portion of the inner member and the flange portion on the side of the opening, but in view of the result of Example 3, it is estimated that sufficient impact resistance can be obtained even in a case where the CFRP member is provided only in the lower portion of the inner member where large plastic strain occurs at the time of side collision. Therefore, even the center pillar inner provided with the CFRP member only in the lower portion of the inner member can satisfy both weight reduction and impact resistance, thereby suppressing a cost for materials.

Further, comparing Examples 1 to 3 and Comparative Examples 3 to 5, impact reduction effects of Comparative Examples 3 to 5 are low in both chest portion and lower back portion, and weight efficiencies thereof are quite inferior. This is because the thermosetting resin (epoxy resin) is low in plastic deformability compared with the thermoplastic resin (phenoxy resin), causing fracture of the CFRP member itself and subsequent peeling of the CFRP from the steel sheet during collision. As shown in Table 2, in Comparative Examples 3 to 5, weight efficiencies are about 1% or 1% or less, that is, nearly equal to that of Comparative Example 2 which is without reinforcement by a CFRP member.

Meanwhile, in Examples 1 to 3, the thermoplastic resin (phenoxy resin) is used for the CFRP member, and it is known that peeling of the CFRP member or fracture of the CFRP member itself does not occur during collision to thereby exhibit excellent performance.

In other words, from the comparison of Examples 1 to 3 and Comparative Examples 3 to 5, it is found that for the CFRP member to be bonded to the center pillar inner, using the phenoxy resin being the thermoplastic resin is preferable to using the epoxy resin being the thermosetting resin.

The center pillar actively makes mainly the lower portion (vehicle lower side) undergo plastic deformation at the time of collision to thereby absorb energy. On the other hand, from a viewpoint of protecting a head portion and a chest portion of an occupant at the time of collision, it is required that an upper side (vehicle upper side) does not undergo active deformation and suppresses an intrusion amount of a member into a vehicle-interior side. The deformation of the lower portion is mainly bending deformation, in which a tensile force becomes larger as approaching the outer side of bending. Thus, disposing the CFRP member with high strength on the outer side of the bending is considered effective.

In a case where the CFRP member is disposed on the outer side of the bending where the tensile force is high, application of the thermosetting resin (for example, epoxy resin) with low ductility to the CFRP member is not preferable since the thermosetting resin fractures (see Comparative Examples 3 to 5). On the other hand, application of the thermoplastic resin (for example, phenoxy resin) with high ductility to the CFRP member leads to efficient energy absorption since fracture is not likely to occur. Based on the above observation and comparison between Examples 1 to 3 and Comparative Examples 3 to 5, for the sake of excellent exhibition of energy absorption effect by bonding the CFRP member on the outer side of the bending (that is, on the vehicle-interior side), it is preferable to apply the thermoplastic resin (for example, phenoxy resin) with high ductility for the CFRP member.

INDUSTRIAL APPLICABILITY

The present invention can be used for a center pillar of an automobile.

EXPLANATION OF CODES 1 center pillar
10 center pillar outer
10a flange portion of center pillar outer
20 center pillar inner
21 inner member
21a opening of inner member
21b side sill mounting portion of inner member
21c upper end portion of inner member
21d flange portion of inner member
21d' flange portion on side of opening
21e lower portion of inner member
22 CFRP member
22a hole of CFRP member
30 side sill

What is claimed is:
1. A center pillar inner comprising:
an inner member having an opening to be a place for mounting a retractor of a seat belt is mounted and a side sill mounting portion to be a place for mounting a side sill; and
a CFRP member joined to a surface of the inner member at a lower portion region between the side sill mounting portion and the opening in the inner member, wherein the CFRP member includes a carbon fiber with a fiber direction falling within a range of 5 degrees to 5 degrees in relation to a longitudinal direction of the inner member and a matrix resin is a thermoplastic resin, the thermoplastic resin is a phenoxy resin, and the CFRP member is provided at least between the opening and the side sill mounting portion.

2. The center pillar inner according to claim 1, wherein the CFRP member is provided further in a flange portion of the inner member on a side of the opening.

3. The center pillar inner according to claim 2, wherein the CFRP member is provided further in a flange portion of the inner member which is positioned upper than the opening.

4. A center pillar, comprising:

a center pillar outer; and the center pillar inner according to claim 1, wherein the center pillar outer and the center pillar inner are joined in flange portions of each other.

* * * * *